US010615608B2

(12) United States Patent
Shukla et al.

(10) Patent No.: US 10,615,608 B2
(45) Date of Patent: Apr. 7, 2020

(54) LOW-WIND OPERATION OF CLUSTERED DOUBLY FED INDUCTION GENERATOR WIND TURBINES (71) Applicant: General Electric Company, Schenectady, NY (US)

(72) Inventors: Saurabh Shukla, Clifton Park, NY (US); Govardhan Ganireddy, Bangalore (IN); John Leo Bollenbecker, Albany, NY (US); Rajni Burra, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 441 days.

(21) Appl. No.: 15/482,072

(22) Filed: Apr. 7, 2017

(65) Prior Publication Data

US 2018/0294650 A1  Oct. 11, 2018

(51) Int. Cl.
*H02J 3/38* (2006.01)
*H02P 13/06* (2006.01)
(Continued)

(52) U.S. Cl.
CPC .............. *H02J 3/386* (2013.01); *F03D 9/257* (2017.02); *H02K 7/183* (2013.01); *H02P 9/007* (2013.01);
(Continued)

(58) Field of Classification Search
CPC .......... H02J 3/386; F03D 9/257; H02K 7/183; H02P 9/007; H02P 13/06; H02P 2101/15;
(Continued)

(56) References Cited

U.S. PATENT DOCUMENTS 6,479,907 B1  11/2002  Eriksson et al.
6,853,094 B2   2/2005  Feddersen et al.
(Continued)

FOREIGN PATENT DOCUMENTS

CN  205123280 U   3/2016
EP    1821382 A2  8/2007
(Continued)

OTHER PUBLICATIONS

Islam et al., "A Transformer-Less Compact and Light Wind Turbine Generating System for Offshore Wind Farms", IEEE International Conference on Power and Energy (PECon), Dec. 2012.
(Continued)

*Primary Examiner* — Pinping Sun
(74) *Attorney, Agent, or Firm* — Dority & Manning, P.A.

(57) ABSTRACT

Systems and methods for operating a cluster transformer operably coupled to cluster of DFIG wind turbines in low-wind conditions are provided. A wind turbine cluster system can include at least one DFIG module, a cluster transformer, and a control device configured to control operation of the cluster transformer based at least in part on a wind parameter. Each DFIG module can include a doubly fed induction generator comprising a rotor configured to generate AC power at a first voltage, a stator configured to generate AC power at a second voltage, and a power conversion system coupled to the rotor to convert power at the first voltage to power at the second voltage. The cluster transformer can be configured to receive power at the second voltage from the at least one DFIG module and convert the power at the second voltage to power at a third voltage.

19 Claims, 6 Drawing Sheets

(51) Int. Cl.
*H02P 9/00* (2006.01)
*H02K 7/18* (2006.01)
*F03D 9/25* (2016.01)
*H02P 101/15* (2016.01)
*H02M 5/458* (2006.01)
*H02M 5/12* (2006.01)

(52) U.S. Cl.
CPC .............. *H02P 13/06* (2013.01); *H02M 5/12* (2013.01); *H02M 5/4585* (2013.01); *H02P 2101/15* (2015.01); *Y02E 10/723* (2013.01); *Y02E 10/725* (2013.01); *Y02E 10/763* (2013.01)

(58) Field of Classification Search
CPC ..... H02M 5/12; H02M 5/4585; Y02E 10/723; Y02E 10/763; Y02E 10/725
See application file for complete search history.

(56) References Cited

U.S. PATENT DOCUMENTS

| | | | |
|---|---|---|---|
| 7,414,331 B2* | 8/2008 | Datta | H02M 1/12 307/54 |
| 7,606,638 B2 | 10/2009 | Fortmann et al. | |
| 7,881,888 B2 | 2/2011 | Garcia | |
| 8,198,742 B2 | 6/2012 | Jorgensen et al. | |
| 8,207,623 B2 | 6/2012 | Rivas et al. | |
| 8,212,411 B2 | 7/2012 | Thorburn et al. | |
| 8,269,363 B2 | 9/2012 | Arinaga | |
| 8,659,178 B2 | 2/2014 | Arlaban Gabeiras et al. | |
| 9,203,334 B2 | 12/2015 | Sakamoto et al. | |
| 9,587,626 B2 | 3/2017 | Sadaba et al. | |
| 10,243,352 B2* | 3/2019 | Wagoner | H02H 7/067 |
| 2003/0015876 A1 | 1/2003 | Ichinose et al. | |
| 2010/0123314 A1* | 5/2010 | Menke | F03D 7/0248 290/44 |
| 2010/0156192 A1* | 6/2010 | Wang | H02J 3/01 307/82 |
| 2010/0176606 A1* | 7/2010 | Gilchrist, III | H02J 3/08 290/40 C |
| 2010/0298991 A1 | 11/2010 | Alonso Sadaba et al. | |
| 2011/0031762 A1 | 2/2011 | Letas | |
| 2011/0304141 A1 | 12/2011 | Van Dyck et al. | |
| 2012/0175962 A1 | 7/2012 | Zhan et al. | |
| 2012/0262129 A1* | 10/2012 | Lu | H02P 9/007 322/28 |
| 2013/0181688 A1* | 7/2013 | Tupper | H02P 9/02 322/61 |
| 2014/0092650 A1 | 4/2014 | Alston et al. | |
| 2014/0291990 A1 | 10/2014 | Sala Lluma et al. | |
| 2015/0035282 A1 | 2/2015 | Garcia Sayes et al. | |
| 2015/0152850 A1 | 6/2015 | Nielsen | |
| 2015/0219075 A1* | 8/2015 | Cardinal | F03D 7/00 290/44 |
| 2015/0263526 A1 | 9/2015 | Kjar et al. | |
| 2015/0267683 A1 | 9/2015 | Ubben et al. | |
| 2016/0065105 A1* | 3/2016 | Hardwicke, Jr. | H02P 9/007 290/44 |
| 2016/0146191 A1 | 5/2016 | Berroteran Gil et al. | |
| 2016/0285399 A1 | 9/2016 | Wang et al. | |
| 2016/0308368 A1 | 10/2016 | Letas | |
| 2017/0133971 A1* | 5/2017 | Huang | H02H 7/09 |

FOREIGN PATENT DOCUMENTS

| | | |
|---|---|---|
| EP | 2209205 A1 | 7/2010 |
| EP | 2341594 A1 | 7/2011 |
| EP | 2375529 A1 | 10/2011 |
| EP | 2209205 B1 | 3/2012 |
| WO | WO03025390 A1 | 3/2003 |
| WO | WO03025391 A1 | 3/2003 |
| WO | WO2009/003508 A1 | 1/2009 |
| WO | WO2009/082204 A1 | 7/2009 |
| WO | WO 2009/082326 A1 | 7/2009 |
| WO | WO 2012/073228 A1 | 6/2012 |

OTHER PUBLICATIONS

Gjerde et al., "Control and Fault Handling in a Modular Series-Connected Converter for a Transformer Less 100 kV Low-Weight Offshore Wind Turbine", IEEE Transactions on Industry Applications, vol. 50, Issue 2, pp. 1094-1105, Mar.-Apr. 2014.

Lam et al., "A High Efficient Medium Voltage Step-up DC/DC Converter With Zero Voltage Switching (ZVS) and Low Voltage Stress for Offshore Wind Energy Systems", 16th European Conference on Power Electronics and Applications (EPE'14—ECCE Europe), Aug. 26-28, 2014.

Digitally controlled wind turbines in megawatt size with doubly-fed induction generator without position sensor, http://control-design.de/home_eng/Applications/Windenergy/body_windenergy.html.

Ekanayake, et al., "Dynamic modeling of doubly fed induction generator wind turbines," in IEEE Transactions on Power Systems, vol. 18, No. 2, pp. 803-809, May 2003.

Qiao, "Dynamic modeling and control of doubly fed induction generators driven by wind turbines," 2009 IEEE/PES Power Systems Conference and Exposition, Seattle, WA, 2009, pp. 1-8.

Alivirdizadeh, et al., A Novel Damping Controller for Inter-Area Oscillation by Means of DFIG-Based Wind Farm, International Journal on Technical and Physical Problems of Engineering, Sep. 2011, Issue 8, vol. 3, No. 3, pp. 118-124.

Zhao, et al., An Optimal Reactive Power Control Strategy for a DFIG-Based Wind Farm to Damp the Sub-Synchronous Oscillation of a Power System. Energies 2014, 7, 3086-3103.

U.S. Appl. No. 14/475,616, filed Sep. 3, 2014.
U.S. Appl. No. 15/059,343, filed Mar. 3, 2016.
U.S. Appl. No. 15/071,327, filed Mar. 16, 2016.
U.S. Appl. No. 15/218,121, filed Jul. 25, 2016.
U.S. Appl. No. 15/399,001, filed Jan. 5, 2017.
U.S. Appl. No. 15/399,049, filed Jan. 5, 2017.
U.S. Appl. No. 15/399,067, filed Jan. 5, 2017.

Baron et al., Breaking the 34.5kV Standard, Drawing on hydro experience, Acciona extols use of 12kV collection system to lower energy costs through elimination of step-up transformers, Wind Systems Magazine, Apr. 2013, pp. 48-54.

Olonso Sadaba et al., Wind Generation Control Strategies for Grid Integration Acciona Windpower Experience, ResearchGate, Acciona Windpower, S.A., uploaded 2015, 11 Pages. https://www.researchgate.net/publication/267966410.

International Search Report and Written Opinion issued in connection with corresponding PCT Application No. PCT/US2018/026386 dated Jul. 26, 2018.

* cited by examiner

LOW-WIND OPERATION OF CLUSTERED DOUBLY FED INDUCTION GENERATOR WIND TURBINES

FIELD

The present disclosure relates generally to renewable energy sources, and more particularly to a systems and methods for operating doubly fed induction generator wind turbines in low-wind conditions.

BACKGROUND

Wind turbines have received increased attention as a renewable energy source for generating electricity. In a conventional wind farm, a plurality of wind turbines can be arranged in one or more clusters. Each cluster can include a plurality of wind turbines connected to a collection system, such as a 33 kV collection system. In a typical configuration, a doubly fed induction generator (DFIG) wind turbine can include a rotor and stator. The rotor can be configured to generate electricity at a first voltage, such as 690 V, and the stator can be configured to generate electricity at a second voltage, such as 6 kV. A power converter can be coupled to the rotor, which can convert the power from the rotor and provide it to an auxiliary winding on a three-winding transformer. The three-winding transformer can have, for example, a 33 kV primary winding coupled to the collection system, a 6 kV secondary winding coupled to the stator, and a 690 kV auxiliary winding coupled to the power converter, and can be configured to convert power from both the rotor and stator to a 33 kV AC power. The collection system, such as a 33 KV collection system, can be coupled to the primary winding of each three-winding transformer in a cluster of wind turbines, and can provide the power from one or more clusters to a grid-connected transformer. The grid connected transformer can convert the power to a voltage suitable for transmission on a transmission system.

During operation of the wind farm, wind conditions, such as speed and direction, may vary over time. For example, the wind speed can vary between periods of normal operation, such as winds of 5 m/s or greater, to periods of low-wind conditions, such as winds of less than 5 m/s. During low-wind conditions, the rotor speed of a DFIG may drop, and the power converter may not be able to stay connected to the rotor winding if the slip speed (i.e., the difference between the synchronous frequency and the rotor speed converter into electrical frequency) dips below a slip speed threshold. This slip speed threshold can be due to the rating of power semiconductor devices (e.g., MOSFETs) in the power converter. When this occurs, a system protection scheme may be triggered, which can shut down the DFIG and prevent power production during low-wind conditions.

BRIEF DESCRIPTION

Aspects and advantages of the invention will be set forth in part in the following description, or may be obvious from the description, or may be learned through practice of the invention.

One example aspect of the present disclosure is directed to a wind turbine cluster system. The wind turbine cluster system can include at least one doubly fed induction generator (DFIG) module. Each DFIG module can include a doubly fed induction generator comprising a rotor and a stator. The rotor can be configured to generate AC power at a first voltage and the stator can be configured to generate AC power at a second voltage. Each DFIG module can further include a power conversion system operably coupled to the rotor. The power conversion system can be configured to convert power at the first voltage to power at the second voltage. The wind turbine cluster system can further include a cluster transformer configured to receive power at the second voltage from the at least one DFIG module and convert the power at the second voltage to power at a third voltage. The wind turbine cluster system can further include a control device configured to control operation of the cluster transformer based at least in part on a wind parameter.

Another example aspect of the present disclosure is directed to a method for operating a cluster transformer. The cluster transformer can be operably coupled to one or more doubly fed induction generator (DFIG) modules. Each DFIG module can include a DFIG and a power conversion system. The cluster transformer can be configured to convert power from the one or more DFIG modules into a power suitable for application to an electrical grid. The method can include operating the cluster transformer in a normal wind mode. The method can further include determining a first wind parameter by a control device. The method can further include determining, by the control device, whether the first wind parameter is less than a threshold. When the first wind parameter is less than the threshold the method can further include controlling, by the control device, the cluster transformer into a low-wind operation mode.

Yet another example aspect of the present disclosure is directed to a wind farm. The wind farm can include a plurality of wind turbine clusters and a wind farm control device. Each wind turbine cluster can include a plurality of doubly fed induction generator (DFIG) modules and a cluster transformer operably coupled to the plurality of DFIG modules. Each DFIG module can include a DFIG, which can include a rotor and a stator. The rotor can be configured to generate AC power at a first voltage and the stator can be configured to generate AC power at a second voltage. Each DFIG module can further include a power conversion system operably coupled to the rotor. The power conversion system can be configured to convert power at the first voltage to power at the second voltage. Each cluster transformer can be configured to convert power at the second voltage from the plurality of DFIG modules in the wind turbine cluster to power suitable for application to a grid. The wind farm control device can be configured to control operation of the cluster transformer in each wind turbine cluster based at least in part on a measured or forecasted wind parameter.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to systems and methods to operating a DFIG wind turbine during low-wind conditions. According to example aspects of the present disclosure, a wind turbine cluster system can include at least one DFIG module, a cluster transformer, and a control device configured to control operation of the cluster transformer based at least in part on a wind parameter. Each DFIG module can include a DFIG, which can include a rotor and a stator. The rotor can be configured to generate multi-phase alternating current ("AC") power at a first voltage and the stator can be configured to generate multi-phase AC power at a second voltage. Each DFIG module can also include a power conversion system operably coupled to the rotor. The power conversion system can be configured to convert power at the first voltage to power at the second voltage. For example, a DFIG can have a stator configured to generate power at a voltage of 13.8 kV, and a rotor configured to generate power at a voltage of 690 V. The power conversion system can be configured to convert the 690 V power from the rotor to the same voltage as power from the stator (i.e., 13.8 kV). The cluster transformer can be configured to receive power from one or more DFIG modules and convert the power to a voltage suitable for application to a grid. For example, the cluster transformer can be configured to transform power from 13.8 kV to 132 kV.

In one or more embodiments, the cluster transformer can be an on load tap changing ("OLTC") transformer. For example, an OLTC transformer can include a plurality of taps on either the primary or secondary winding of the transformer, wherein each tap position is configured to allow a current to flow through a discrete number of windings in order to adjust a voltage transformation up or down. The OLTC transformer can be configured to allow for a voltage to be changed while the transformer is in operation (i.e. without interrupting the flow of power). The OLTC transformer can be, for instance, a mechanical, electronically-assisted, or fully electronic OLTC transformer.

In other embodiments, the cluster transformer can be a transformer with a first tap for low-wind operation, and a second tap for normal operation. For example, the cluster transformer can be a two winding transformer with the primary and a secondary winding. The secondary winding can include two discrete taps, wherein each tap is configured to allow a current to flow through a discrete number of windings in order to adjust a voltage transformation ratio. The first tap can be associated with a low-wind operation mode, and the second tap can be associated with a normal operation mode.

In other embodiments, a cluster transformer can be a transformer with a first winding for low-wind operation and a second winding for normal operation. For example, a cluster transformer can be a three winding transformer with a primary winding, a secondary winding for low-wind operation, and a tertiary winding for normal operation. During low-wind conditions, power can be provided to the secondary winding, and during normal wind conditions, power can be provided to the tertiary winding.

The control device can be configured to control operation of the cluster transformer based at least in part on a wind parameter. For example, a control device can be configured to determine a concurrent wind parameter, such as an average wind speed over a period of time based on one or more wind speed measurements. If the average wind speed is above a certain threshold, the control device can be configured to determine that the cluster transformer should operate in a normal wind mode. If, however, the wind parameter is less than a certain threshold, the control device can be configured to determine that the cluster transformer should be operated in a low-wind mode.

In one or more embodiments, the control device can be configured to determine a forecasted wind parameter for a future time period. For example, in various embodiments, a control device can be configured to determine a forecasted wind parameter, such as a forecasted average wind speed for one or more clusters in a wind farm, using a wind model, meteorological data, historical operational data, measured wind conditions, and/or weather forecasts. In this way, a control device can be configured to predict a wind parameter for a future time period, and further, control the cluster transformer to a low-wind operation mode before the low-wind condition occurs.

The control device can further be configured to control the cluster transformer based at least in part on the wind parameter. For example, the control device can be configured to control the cluster transformer to operate in a low-wind mode by, for example, adjusting a tap position of an OLTC transformer, changing the position of the tap from a normal operation tap to a low-wind tap in a two-tap transformer, or switching between providing power from normal operation winding to a low-wind winding in a three-winding transformer. The low-wind operation mode of the cluster transformer can be configured such that the voltage at the stator is at a lower voltage level during low-wind conditions than at normal wind conditions. As a result, the rotor winding voltage can similarly decrease and enable operation of the DFIG at lower rotor revolutions per minute ("RPM"), such as occurs during low-wind conditions.

In an embodiment, the power conversion system can include a first bus electrically connected to the rotor. An AC to DC power converter can be electrically connected to the first bus and can be configured to receive AC power from the rotor via the first bus. The AC to DC power converter can convert AC power received from the rotor to a DC power, which can be provided to a DC link electrically connected to the AC to DC power converter. A DC to AC power converter can be configured to receive the DC power from the DC link and convert the DC power to an AC power. A transformer, such as a two-winding transformer, can be configured to convert the AC power from the DC to AC power converter to AC power at the same voltage as power generated by the stator. In this way, power generated by the rotor and the stator can be provided to a cluster network, and further, to a cluster transformer.

In another embodiment, the DC to AC power converter and the transformer in a power conversion system can be replaced by a resonant DC to DC to AC power converter. The resonant DC to DC to AC power converter can be configured to receive DC power from the DC link and convert the DC power to an AC power at the same voltage as power generated by the stator. Similarly, the power generated by the rotor and the stator can be provided to a cluster network and further to a cluster transformer.

In this way, the devices, systems, and methods according to example aspects of the present disclosure can have a technical effect of allowing for a DFIG turbine to be operated during low-wind conditions. This can allow for an increased annual energy production. Further, this can allow for a higher efficiency of the system due to reduced transformer core losses by operating the clusters at lower voltage levels. Further, the cluster transformer can be leveraged for other control actions, such as limiting a feeder voltage. Moreover, this approach can allow for individual clusters of DFIG turbines to be operated independently of one another, as each cluster transformer can be individually controlled to either a normal wind operation or a low-wind operation mode.

Figure 1:
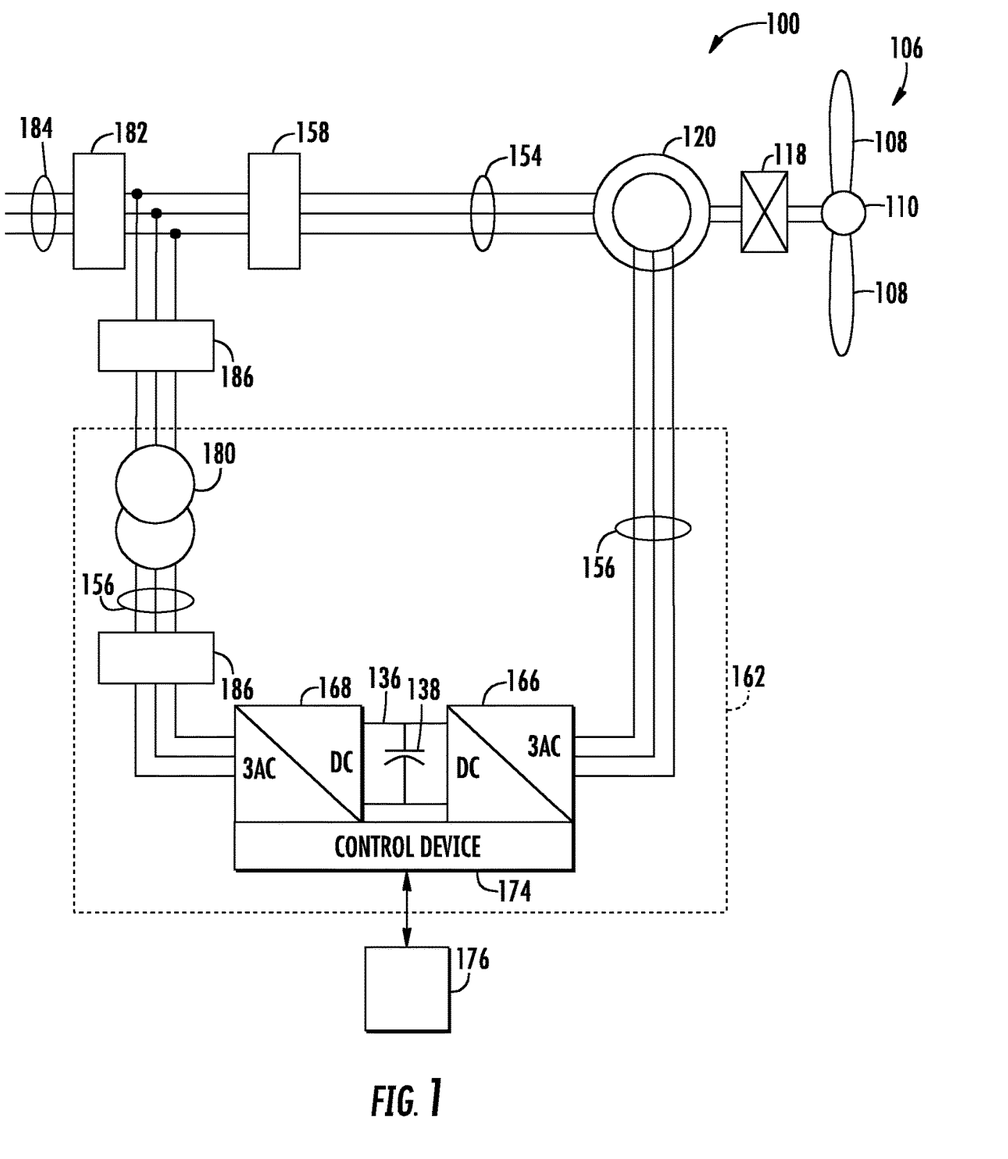
FIG. 1 depicts an example doubly fed induction generator (DFIG) wind turbine module according to example aspects the present disclosure.

Referring to FIG. 1, an example DFIG module 100 will now be discussed in detail. The present disclosure will be discussed with reference to the example DFIG module 100 of FIG. 1 for purposes of illustration and discussion. Those of ordinary skill in the art, using the disclosures provided herein, should understand that aspects of the present disclosure are also applicable in other power systems.

In the example module 100, a rotational component 106 includes a plurality of rotor blades 108 coupled to a rotating hub 110. The rotational component 106 is coupled to an optional gear box 118, which is, in turn, coupled to a generator 120. In accordance with aspects of the present disclosure, the generator 120 is a doubly fed induction generator (DFIG) 120.

DFIG 120 can include a rotor and a stator. The DFIG 120 is typically coupled to a stator bus 154 and a power conversion system 162 via a rotor bus 156. The stator bus provides an output multiphase power (e.g. three-phase power) from a stator of DFIG 120 and the rotor bus 156 provides a multiphase power (e.g. three-phase power) of a rotor of the DFIG 120. Referring to the power conversion system 162, DFIG 120 is coupled via the rotor bus 156 to a rotor side converter 166. The rotor side converter 166 is coupled to a line side converter 168 which in turn is coupled to a line side bus 188. Power conversion system 162 can also include a transformer 180 coupled to the line side bus 188.

In example configurations, the rotor side converter 166 and the line side converter 168 are configured for operating using pulse width modulation (PWM) arrangement of insulated gate bipolar transistors (IGBTs) switching devices or other switching devices. The rotor side converter 166 and the line side converter 168 can be coupled via a DC link 136 across which is the DC link capacitor 138. The transformer 180 can be coupled to a line side bus 188 to convert power from the line side converter 168 to match the voltage on the stator bus 154.

The power conversion system 162 can be coupled to a control device 174 to control the operation of the rotor side converter 166 and the line side converter 168. It should be noted that the control device 174, in typical embodiments, is configured as an interface between the power conversion system 162 and a control system 176.

In some configurations, various line contactors and circuit breakers including, for example, cluster breaker 182, stator bus breaker 158, line bus contactor 172, and line bus breaker 186 can be included for isolating various components as necessary for normal operation of DFIG 120 during connection to and disconnection from a cluster network 184. Line bus breakers 186 can couple the line bus 152 to transformer 180, which is coupled to the cluster network 184 via grid breaker 182.

In operation, power generated at DFIG 120 by rotating the rotational component 106 is provided via a dual path to cluster network 184. The dual paths are defined by the stator bus 154 and the rotor bus 156. On the rotor bus side 156, sinusoidal multi-phase (e.g. three-phase) AC power is provided to the power conversion system 162. The rotor side power converter 166 converts the AC power provided from the rotor bus 156 into direct current ("DC") power and provides the DC power to the DC link 136. Switching devices (e.g. IGBTs) used in parallel bridge circuits of the rotor side power converter 166 can be modulated to convert the AC power provided from the rotor bus 156 into DC power suitable for the DC link 136.

The line side converter 168 converts the DC power on the DC link 136 into AC power, which is provided to the line side bus 188. In particular, switching devices (e.g. IGBTs, MOSFETs, etc.) used in bridge circuits of the line side power converter 168 can be modulated to convert the DC power on the DC link 136 into AC power on the line side bus 188. Transformer 180 can convert the AC power at a first voltage from the line side bus 188 to AC power at a second voltage, such as the voltage of power on the stator bus 154. The AC power from the power conversion system 162 can be combined with the power from the stator of DFIG 120 to provide multi-phase power (e.g. three-phase power) having a frequency maintained substantially at the frequency of the cluster network 184 (e.g. 50 Hz/60 Hz).

The power conversion system 162 can receive control signals from, for instance, the control system 176 via the control device 174. The control signals can be based, among other things, on sensed conditions or operating characteristics of the DFIG module 100. Typically, the control signals provide for control of the operation of the power conversion system 162. For example, feedback in the form of sensed speed of the DFIG 120 can be used to control the conversion of the output power from the rotor bus 156 to maintain a proper and balanced multi-phase (e.g. three-phase) power supply. Other feedback from other sensors can also be used by the control device 174 to control the power conversion system 162, including, for example, stator and rotor bus voltages and current feedbacks. Using the various forms of feedback information, switching control signals (e.g. gate timing commands for IGBTs), stator synchronizing control signals, and circuit breaker signals can be generated.

Figure 2:
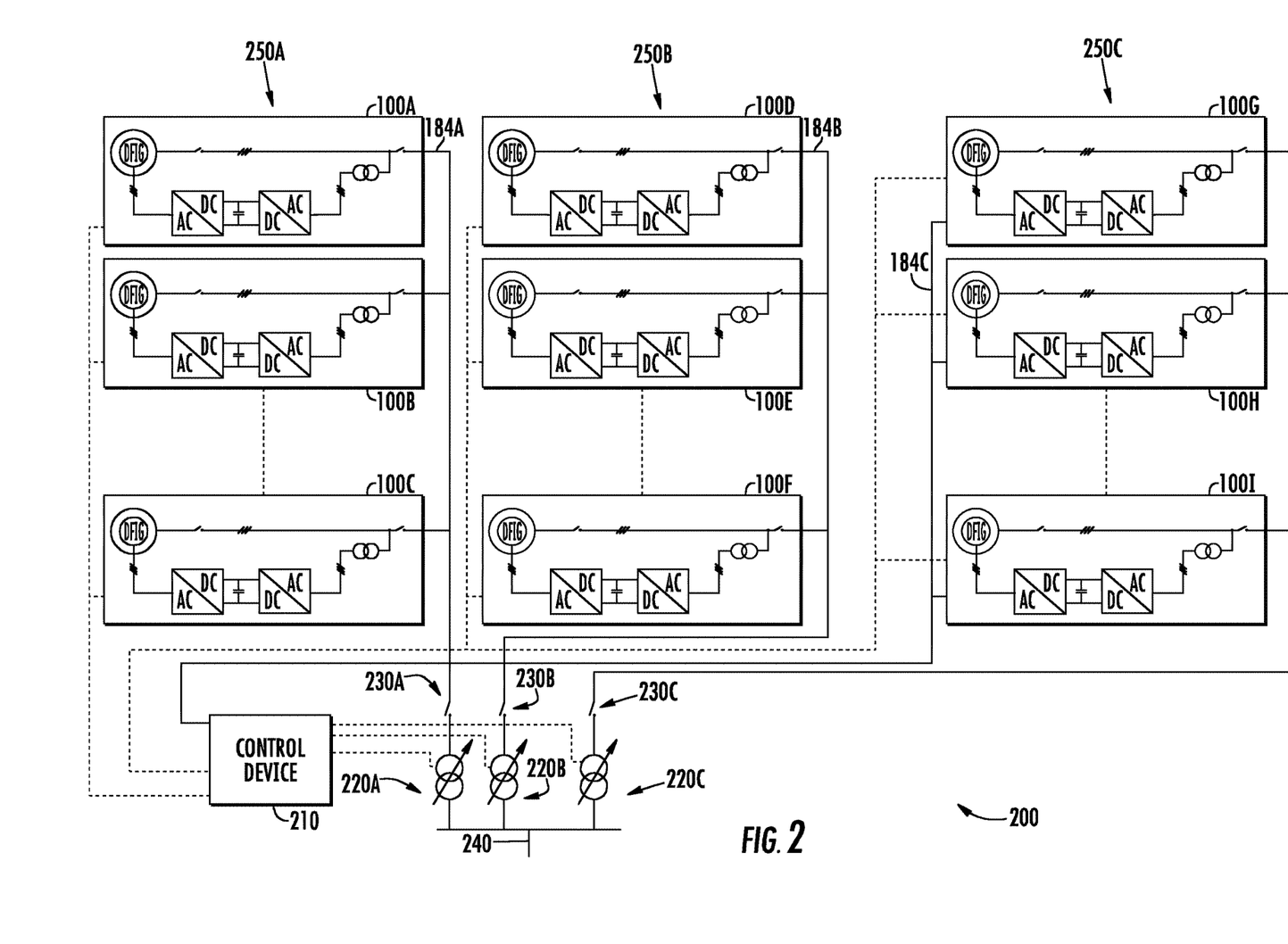
FIG. 2 depicts aspects of an example wind farm according to example aspects of the present disclosure.

FIG. 2 depicts aspects of an example wind farm 200 in accordance with aspects of the present disclosure. As illustrated, wind farm 200 can include one or more wind turbine clusters 250. For example, as shown, wind farm 200 includes a first wind turbine cluster 250A, a second wind turbine cluster 250B, and a third wind turbine cluster 250C. Each wind turbine cluster 250 can include one or more DFIG modules 100. For example, first wind turbine cluster 250A includes a first DFIG module 100A, a second DFIG module 100B, and a third DFIG module 100C. Similarly, second wind turbine cluster 250B includes DFIG modules 100D-F, and third wind turbine cluster 250C includes DFIG modules 100G-I. Each wind turbine cluster 250 can also include a cluster transformer 220. Power generated at each DFIG module 100 can be provided to an associated cluster network 184 configured to transmit power generated by the DFIG modules 100 in a wind turbine cluster 250 to the cluster transformer 220 associated with the wind turbine cluster 250. For example, a first cluster network 184A can be coupled to the first DFIG module 100A, second DFIG module 100B, and third DFIG module 100C in first wind turbine cluster 250A, and when switch 230A is closed, power provided by the DFIG modules 100A-C can be provided by cluster network 184A to cluster transformer 220A. Similarly, second cluster network 184B can transmit power from second wind turbine cluster 250B to second cluster transformer 220B, and third cluster network 184C can transmit power from third wind turbine cluster 250C to third cluster transformer 220C.

As depicted in FIG. 2, each transformer 220 is an on load tap changing ("OLTC") transformer. For example, each OLTC transformer 220 can include a primary winding and a secondary winding, and a plurality of taps such that the voltage across the transformer can be adjusted by changing a position of the tap while the transformer is in operation. As will be discussed in greater detail with reference to FIGS. 3 and 4, a cluster transformer 220 can also be a transformer with a tap for low-wind operation, or a three-winding transformer with a winding for low-wind operation.

The wind farm 200 can further be connected to an electric grid 240. For example, electric grid 240 can be a transmission grid. Each cluster transformer 220 can be configured to transform power from an associated cluster network 184 from the second voltage at each DFIG module 100 to a voltage suitable for application to electric grid 240. For example, a cluster network 184 can be operated at a second voltage, such as a medium voltage ("MV") of 6-13.8 kV, and a grid voltage can be operated at a high voltage ("HV"), such as 132 kV. Each cluster transformer 220 can be configured to step up the voltage from the MV cluster network to the same voltage as the electric grid 240.

The wind farm can also include a control device 210. Control device 210 can be configured to control operation of one or more cluster transformers 220. For example, in an embodiment, a control device 210 can be a cluster control device 210 configured to control operation of an individual cluster transformer 220. In another embodiment, a control device 210 can be a farm-level control device 210, and can be configured to control a plurality of cluster transformers 220 in a wind farm 200.

The control device 210 can be configured to control operation of a cluster transformer in a wind turbine cluster 250 based at least in part on a wind parameter. For example, a control device 210 can be configured to determine a concurrent wind parameter, such as a wind speed measurement. For example, one or more wind sensors (e.g., wind vanes, anemometers, or other wind measurement sensors) can be configured to determine a concurrent wind speed measurement for an individual DFIG module 100, a wind turbine cluster 250, or a wind farm 200. The wind speed measurements can be, for example, an average wind speed over a period of time or a plurality of discrete wind speed measurements. The one or more wind sensors can be configured to provide one or more signals indicative of a wind speed measurement to a control device 210. Additionally and/or alternatively, a control device 210 can be coupled to one or more communication networks, which can be configured to provide one or more wind speed measurements from one or more external sensors, such as, for example, meteorological data provided by a third-party. One of ordinary skill in the art, using the disclosures provided herein, will recognize that a concurrent wind speed parameter used by a control device 210 can be provided by any suitable device.

If the concurrent wind speed parameter, such as a measured average wind speed, is at or above a certain threshold, the control device 210 can be configured to determine that the cluster transformer 220 should be operated in a normal wind mode. If, however, the concurrent wind parameter is less than a certain threshold, the control device 210 can be configured to determine that the cluster transformer 220 should be operated in a low-wind mode.

In one or more embodiments, the control device 210 can be configured to determine a forecasted wind parameter for a future time period. For example, in various embodiments, a control device 210 can be configured to determine a forecasted wind parameter, such as a forecasted average wind speed for one or more turbine clusters 250 in a wind farm 200. For example, a plurality of wind sensors can be arranged in a circumferential pattern around a wind farm 200 such that one or more of the wind sensors can be configured to determine an upstream wind condition from the wind farm 200 regardless of the direction that the wind is blowing. The one or more wind sensors can provide one or more signals indicative of one or more wind speed measurements to a control device 210, which can be configured to determine a forecasted wind parameter such as, for example, by using a wind model. Additionally and/or alternatively, a control device 210 can be coupled to one or more communication networks, which can be configured to provide measurements from one or more wind sensors from an external source, such as a meteorological data provider. Similarly, a control device 210 can be configured to receive one or more forecasted wind speed parameters from an external source.

Additionally and/or alternatively, a control device 210 can be configured to determine a forecasted wind parameter based on historical operational data for one or more DFIG modules 100 in a wind farm 200. For example, a control device 210 can be configured to access a database of historical operational data, which can include wind speed measurements, voltage measurements, current measurements, power production figures, and other operational data for various times of the day under various operating scenarios. A control device 210 can be configured to determine a forecasted wind parameter for a future time period by, for example, implementing a machine learning algorithm that can determine relationships between historical operational data and concurrent wind conditions. For example, a control device 210 can be configured to determine that during operation if a concurrent wind speed is at first wind speed, the wind speed for a future time period can be expected to change to a second wind speed. In this way, a control device 210 can be configured to determine a wind parameter for a future time period. One of ordinary skill in the art, using the disclosures provided herein, will recognize that a control device 210 can be configured to determine a forecasted wind parameter for a future time period using any suitable means.

The control device 210 can further be configured to control the cluster transformer 220 based at least in part on the wind parameter. A control device 210 can be configured to determine that the wind parameter is less than a threshold, and that therefore a low-wind condition is occurring or will occur at a future time period. For example, a control device 210 may determine that a forecasted wind speed at a future time period is less than a threshold wind speed for normal operation, such as approximately 5 m/s. As used herein, the term "approximately" means within 20 percent of the stated value. The control device 210 can then be configured to control the cluster transformer 220 to operate in a low-wind mode by, for example, adjusting a tap position of an OLTC transformer 220. The control device 210 can send a control signal to an actuator associated with the OLTC transformer 220, which can adjust a position of a tap in the OLTC transformer 220 to adjust a voltage on a cluster network 184. For example, during low-wind conditions, a control device 210 can send a control signal to an OLTC transformer 220 to tap down a position of the tap to reduce a voltage on a cluster network 184. In turn, a DFIG 120 in a DFIG module 100 will see a reduced voltage at the stator, and similarly at the rotor. This can allow for the slip speed of the rotor to fall within a range required for operation of the power semiconductor devices in a power conversion system 162, thereby enabling energy production during a low-wind condition.

Figure 3:
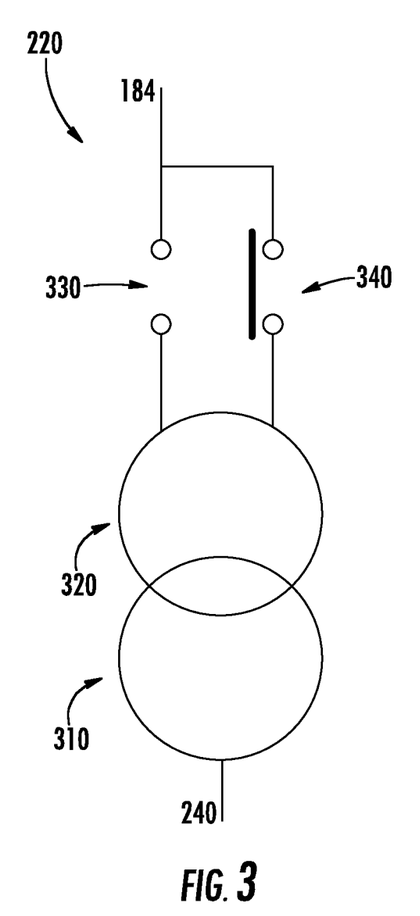
FIG. 3 depicts a cluster transformer according to example aspects of the present disclosure.

Referring now to FIG. 3, a cluster transformer 220 according to example embodiments of the present disclosure is depicted. Similar to the OLTC cluster transformer 220 depicted in FIG. 2, the cluster transformer 220 in FIG. 3 can be connected to a cluster network 184. Energy generated by one or more DFIG modules 100 can be provided to the cluster transformer 220 by the cluster network 184.

As shown, a cluster transformer 220 can be a two-winding transformer with two discrete taps. For example, as shown, a cluster transformer 220 can include a primary winding 310 and a secondary winding 320. The primary winding 310 side of the cluster transformer 220 can be coupled to an electric grid 240, such as a transmission grid. The secondary winding 320 can include two discrete taps. For example, a first tap 330 can be configured for low-wind operation, and a second tap 340 can be configured for normal operation. Each tap can be associated with a discrete number of windings on the secondary winding 320 of the cluster transformer 220. For example, a first tap 330 can be associated with a first number of windings of the secondary winding 320 and the second tap 340 can be associated with a second number of windings of the secondary winding 320 such that the voltage applied to the cluster network 184 is a lower voltage when the first tap 330 is in operation as compared to the second tap 340, and vice-versa.

During normal operation, a control device 210 can control the cluster transformer 220 to a normal operation mode by connecting the second tap 340 to the cluster network 384, as shown in FIG. 3. The cluster transformer 220 can then step up the voltage of power provided by the cluster network 184 to a voltage suitable for application to electrical grid 240. However, during low-wind conditions, a control device 210 can control the cluster transformer 220 to a low-wind operation mode by connecting the first tap 330 to the cluster network 184. This can reduce the voltage on the cluster network 184, while still stepping up the voltage of the power provided by the cluster network 184 to a voltage suitable for application to an electric grid 240.

Figure 4:
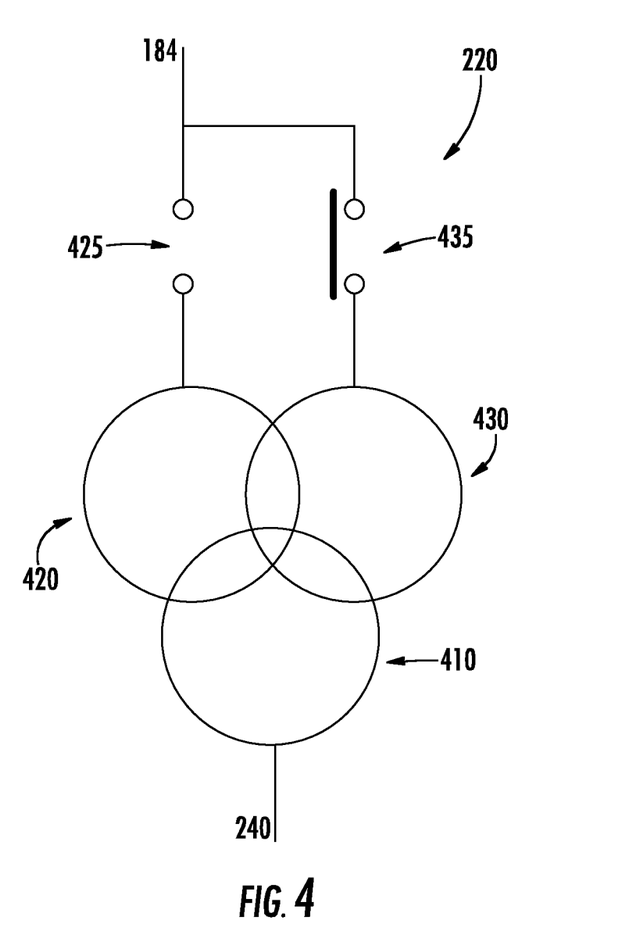
FIG. 4 depicts a cluster according to example aspects of the present disclosure.

Referring now to FIG. 4, a cluster transformer 220 according to example embodiments of the present disclosure is depicted. Similar to the cluster transformers 220 depicted in FIGS. 2 and 3, the cluster transformer 220 in FIG. 4 can be connected to a cluster network 184. Energy generated by one or more DFIG modules 100 can be provided to the cluster transformer 220 by the cluster network 184.

As shown, a cluster transformer 220 can be a three-winding transformer. For example, as shown, a cluster transformer 220 can include a primary winding 410, a secondary winding 420, and a tertiary winding 430. The primary winding 410 side of the cluster transformer 220 can be coupled to an electric grid 240, such as a transmission grid. The secondary winding 420 can include a first switch 425 for connecting the secondary winding 420 to the cluster network 184, and the tertiary winding 430 can include a second switch 435 for connecting the tertiary winding 430 to the cluster network 184. The secondary winding 420 and tertiary winding 430 can each have a discrete number of windings coupled to the primary winding 410 of the cluster transformer 220. For example, a secondary winding 420 can be configured for low-wind operation and a tertiary winding 430 can be configured for normal operation. For example, a secondary winding 420 have a first number of windings and a tertiary winding 430 can have a second number of windings such that the voltage applied to the cluster network 184 is a lower voltage when power is provided to the secondary winding 420 than when power is provided to the tertiary winding 430, and vice-versa.

During normal operation, a control device 210 can control the cluster transformer 220 to a normal operation mode by connecting the tertiary winding 430 to the cluster network 384, as shown in FIG. 4. The cluster transformer 220 can then step up the voltage of power provided by the cluster network 184 to a voltage suitable for application to electrical grid 240. However, during low-wind conditions, a control device 210 can control the cluster transformer 220 to a low-wind operation mode by switching from the tertiary winding 430 to the secondary winding 420. This can reduce the voltage on the cluster network 184, while still stepping up the voltage of the power provided by the cluster network 184 to a voltage suitable for application to an electric grid 240.

Figure 5:
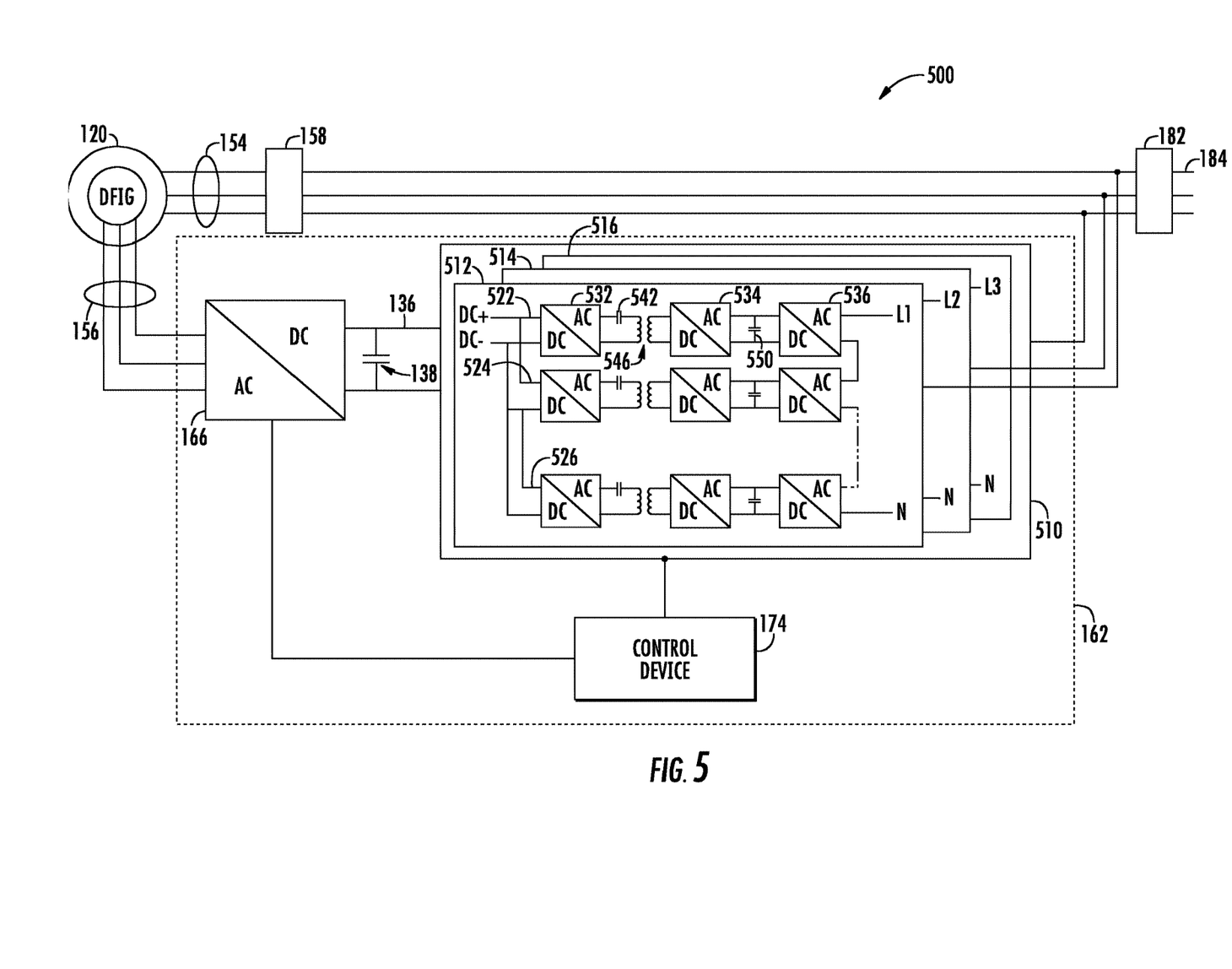
FIG. 5 depicts an example doubly fed induction generator (DFIG) wind turbine module according to example aspects the present disclosure.

Referring now to FIG. 5, an example DFIG module 500 according to example aspects of the present disclosure is depicted. Similar to the DFIG module 100 depicted in FIG. 1, the DFIG module 500 can include a DFIG 120 with a stator coupled to a stator bus 154 and a rotor coupled to a rotor bus 156. A power conversion system 162 can be configured to receive power from the rotor bus 156. For example, a multiphase power (e.g., three-phase power) can be provided to a rotor side converter 166, which can be an AC to DC converter. The rotor side converter 166 can then provide DC power to a DC link 136 across which is a DC link capacitor 138.

However, as depicted in FIG. 5, the power conversion system 162 can include a resonant DC to DC to AC power converter 510 configured to receive DC power from the DC link 136. The resonant DC to DC to AC power converter 510 can be configured to convert the DC power from the DC link 136 to an AC power at the same voltage as the power generated by the stator of the DFIG 120. The power output from the resonant DC to DC to AC power converter can then be combined with power generated by the stator and provided to a cluster network 184.

The resonant DC to DC to AC power converter 510 can be, for example, a multiphase (e.g., three-phase) power converter, which can include a conversion module for each phase. As shown, the resonant DC to DC to AC power converter 510 includes a conversion module 512, a conversion module 514, and a conversion module 516. The conversion modules 512-516 can each be configured to receive a LV DC power from the DC link 136, and to convert the LV DC power to a MV AC power for feeding to the cluster network 184. Each conversion module 512-516 can be associated with a single phase of three-phase output AC power. In particular, conversion module 512 can be associated with the phase A output of the three-phase output power, conversion module 514 can be associated with the phase B output of the three-phase output power, and conversion module 516 can be associated with the phase C output of the three-phase output power.

Each conversion module 512-516 can include a plurality of inverter blocks 522-526. For instance, as shown, conversion module 512 includes inverter blocks 522, inverter block 524, and inverter block 526. In an embodiment, each conversion module 512-516 can include any number of inverter blocks 522-526. The resonant DC to DC to AC converter 510 can be a bidirectional power converter. The resonant DC to DC to AC converter 510 can be configured to convert a LV DC power to a MV AC power and vice versa. For instance, when providing power to the electrical grid 184, the resonant DC to DC to AC converter 510 can be configured to receive a LV DC power from the DC link 136 on a LV side of the resonant DC to DC to AC converter 510, and to output a MV AC power on a MV side of the resonant DC to DC to AC converter 510. The inverter blocks 522-526 can be coupled together in parallel on the LV side and can be coupled together in series on the MV side. Using a plurality of inverter blocks 522-526, a desired voltage on the MV side of the resonant DC to DC to AC power converter can be developed to match the voltage of power generated by the stator.

Each inverter block 522-526 can include a first conversion entity 532, a second conversion entity 534, and a third conversion entity 536. Each conversion entity can include a plurality of bridge circuits coupled in parallel, and each bridge circuit can include a plurality of switching devices coupled in series. The switching devices can be SiC MOSFETs, which can be operated at higher switching frequencies than conventional IGBTs. Each conversion entity 532-536 can be a DC to AC or AC to DC conversion entity, as depicted.

As shown, inverter block 522 further includes an isolation transformer 546. The isolation transformer 546 can be coupled to conversion entity 532 and conversion entity 534. As shown, the inverter block 522 can further include a capacitor 550 which can be connected across a DC link between second conversion entity 534 and third conversion entity 536.

First conversion entity 532, isolation transformer 546, and second conversion entity 534 can together define an inner converter, which can be a high-frequency resonant inner converter. In a resonant converter configuration, a resonant capacitor 542 can be included in inner converter. In various embodiments, a resonant capacitor 542 can be included on a DC link side of the isolation transformer 546 as depicted in FIG. 2, on a cluster network side of the isolation transformer 546 (not depicted), or on both the DC link and grid sides of the isolation transformer 546 (not depicted).

In one particular example implementation, when providing power to the cluster network 184, the conversion entity 532 can be configured to convert the LV DC on the DC link 126 to a LV AC power. The isolation transformer 546 can be configured to provide isolation. The conversion entity 534 can be configured to convert the LV AC power to a LV DC power. The conversion entity 536 can be configured to convert the LV DC power to a LV AC power suitable for provision to the cluster network 184. A plurality of inverter blocks can be connected in series to build a MV AC voltage suitable to match the MV AC power provided by a stator of a DFIG 120.

The inverter blocks 522-526 can be configured to contribute to the overall MV AC power provided by the conversion module 512. In this manner, any suitable number of inverter blocks 522-526 can be included within the conversion modules 512-516. As indicated, each conversion module 512-516 can be associated with a single phase of output power. In this manner, the switching devices of the conversion modules 512-516 can be controlled using suitable gate timing commands (e.g. provided by one or more suitable driver circuits) to generate the appropriate phase of output power to be provided to the electrical grid. For example, the control device 174 can provide suitable gate timing commands to the gates of the switching devices of the bridge circuits. The gate timing commands can control the pulse width modulation of the SiC MOSFETs and/or IGBTs to provide a desired output. In this way, power generated by the rotor of a DFIG 120 can be converted to power matching the voltage of power generated by the stator of the DFIG 120 without the use of a two-winding transformer 180 as depicted in FIG. 1.

Figure 6:
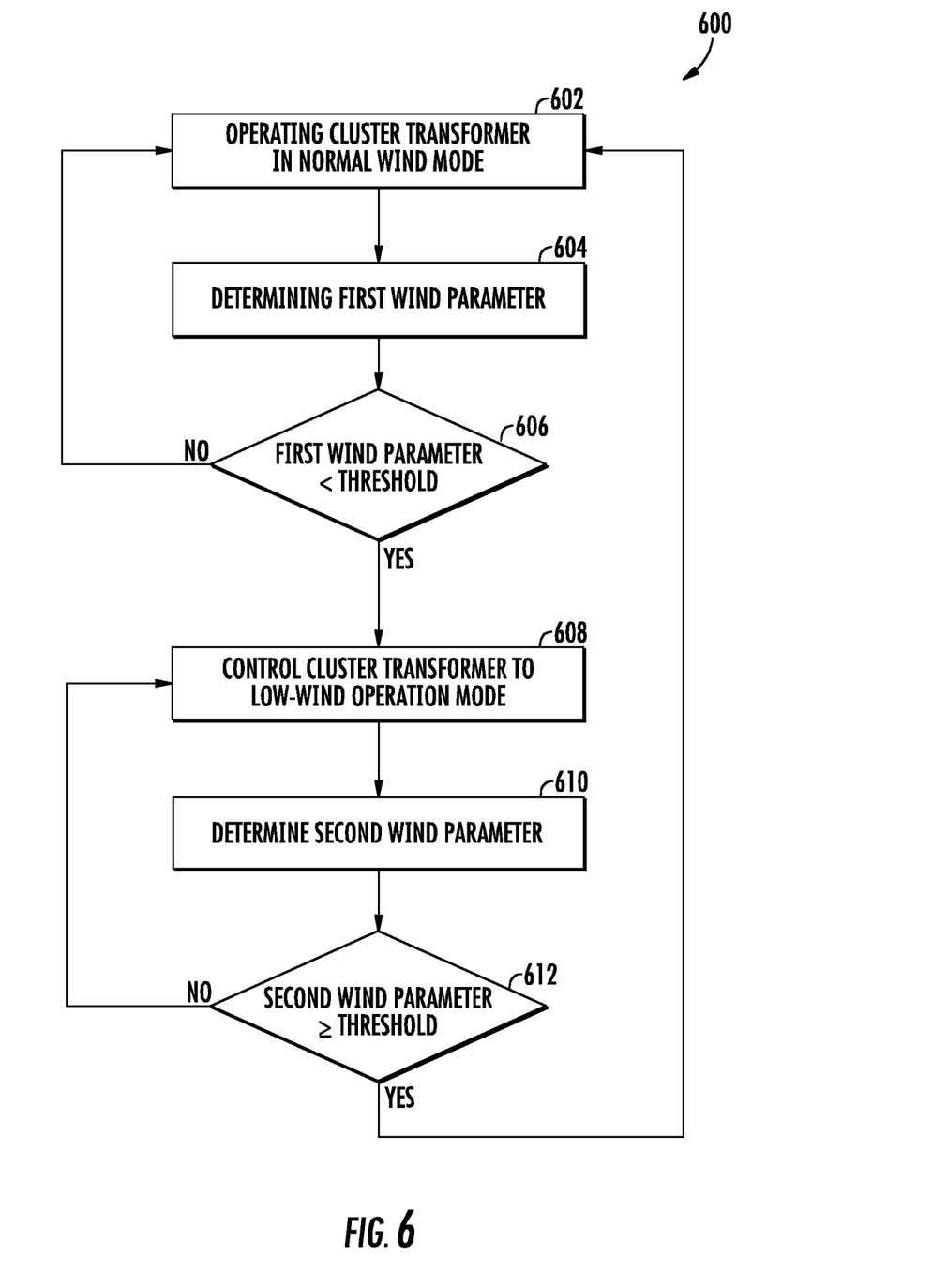
FIG. 6 depicts a method according to example aspects of the present disclosure.

FIG. 6 depicts a flow diagram of an example method (600) according to example embodiments of the present disclosure. FIG. 6 can be implemented using one or more control devices, such as any of the control devices described in this application (e.g., control device 174, control system 176, control device 210, control device 710, etc.). In addition, FIG. 6 depicts steps performed in a particular order for purposes of illustration and discussion. Those of ordinary skill in the art, using the disclosures provided herein, will understand that various steps of any of the methods disclosed herein can be adapted, modified, omitted, performed concurrently, rearranged, and/or expanded in various ways without deviating from the scope of the present disclosure.

At (602), the method (600) can include operating a cluster transformer in a normal wind mode. For example, a cluster transformer 220 can be an OLTC cluster transformer, a two-tap cluster transformer with two discrete taps for normal/low-wind operation, or a three-winding cluster transformer with separate windings for normal/low-wind operation. The tap position of an OLTC cluster transformer, a tap associated with a normal operation mode, or a winding associated with a normal operation mode can be used to transform power from a cluster of DFIG modules 100 to a voltage suitable for application to an electrical grid 240.

At (604), the method (600) can include determining a first wind parameter. For example, a first wind parameter can be a concurrent wind parameter, such as an average measured wind speed for a DFIG module 100, a cluster 250, or a wind farm 200. Additionally and/or alternatively, a first wind parameter can be a forecasted wind parameter for a future time period. The first wind parameter can be determined by a control device, such as a cluster-level or farm-level control device 210. The first wind parameter can be based at least in part on one or more wind speed measurements, historical operational data, third-party data, or any other wind parameter data described herein.

At (606), the method (600) can include determining whether the first wind parameter is less than a threshold. For example, a threshold can be set such that when the wind parameter is greater than or equal to the threshold, one or more DFIG modules 100 can be operated in a normal operation mode. For example, a threshold of approximately 5 m/s can be used to delineate between a low-wind condition and a normal wind condition. If the first wind parameter is not less than the threshold, the method (600) can continue operating a cluster transformer 220 in normal wind mode at (602). If, however, the first wind parameter is less than the threshold, a control device, such as a cluster-level or farm-level control device 210 can control a cluster transformer to a low-wind operation mode at (608). For example, a control device 210 can change a tap position on an OLTC cluster transformer, change the position of a tap between a second tap configured for normal operation to a first tap for low-wind operation in a two-tap cluster transformer, or switch between providing power to a first winding for low-wind operation from a second winding for normal operation in a three-winding cluster transformer.

At (610), the method (600) can include determining a second wind parameter. As with the first wind parameter, the second wind parameter can be a concurrent wind parameter, such as an average measured wind speed for a DFIG module 100, a cluster 250, or a wind farm 200. Additionally and/or alternatively, a second wind parameter can be a forecasted wind parameter for a future time period. The second wind parameter can be determined by a control device, such as a cluster-level or farm-level control device 210. The first wind parameter can be based at least in part on one or more wind speed measurements, historical operational data, third-party data, or any other wind parameter data described herein.

At (612), the method (600) can include determining whether the second wind parameter is greater than or equal to the threshold. For example, the threshold can be set such that when the wind parameter is greater than or equal to the threshold, one or more DFIG modules 100 can be operated in a normal operation mode. For example, a threshold of approximately 5 m/s can be used to delineate between a low-wind condition and a normal wind condition. If the second wind parameter is greater than or equal to the threshold, a control device, such as a cluster-level or farm-level control device 210 can control a cluster transformer 220 to a normal operation mode at (602). For example, a control device 210 can change a tap position on an OLTC cluster transformer, change the position of a tap between a first tap configured for low-wind operation to a second tap for normal operation in a two-tap cluster transformer, or switch between providing power to a second winding for normal operation from a first winding for low-wind operation in a three-winding cluster transformer. If, however, the second wind parameter is less than the threshold, the control device 210 can continue operating a cluster transformer 220 in low-wind mode at (608).

Figure 7:
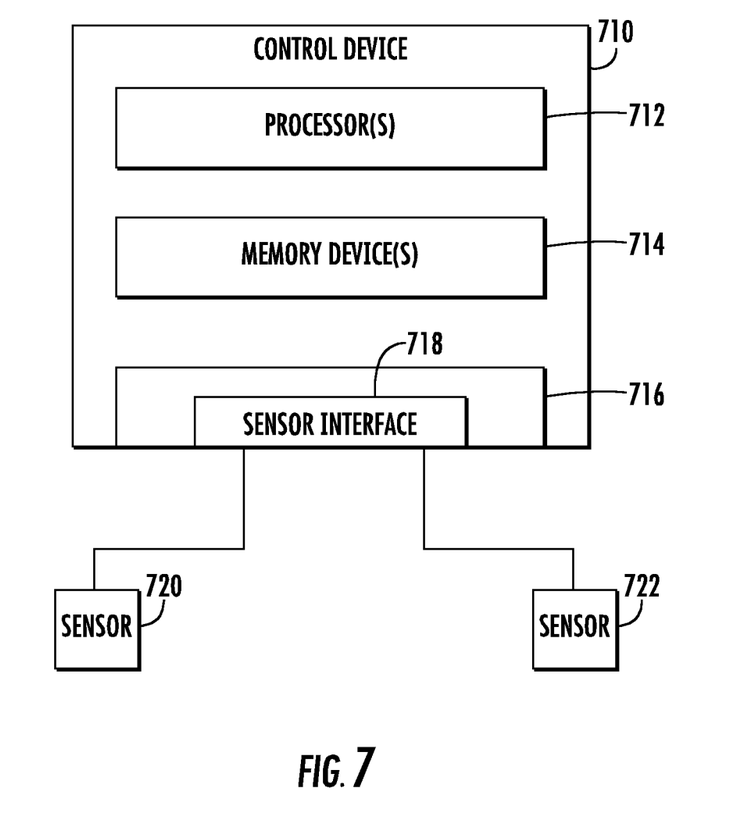
FIG. 7 depicts elements suitable for use in a control device for implementing one or more aspects according to example embodiments of the present disclosure.

FIG. 7 depicts an example control device 710 according to example embodiments of the present disclosure. The control device 710 can include a master control device associated with, for instance, a power system (e.g., a cluster-level or farm-level control device) and/or can include one or more control devices associated with aspects of a power system, such as one or more control devices associated with a power conversion system 162. In some embodiments, the one or more control devices 710 can include one or more processor(s) 712 and one or more memory device(s) 714. The processor(s) 712 and memory device(s) 714 can be distributed so that they are located at one more locales or with different devices.

The processor(s) 712 and memory device(s) 714 can be configured to perform a variety of computer-implemented functions and/or instructions (e.g., performing the methods, steps, calculations and the like and storing relevant data as disclosed herein). The instructions when executed by the processor(s) 712 can cause the processor(s) 712 to perform operations according to example aspects of the present disclosure. For instance, the instructions when executed by the processor(s) 712 can cause the processor(s) 712 to implement the method of FIG. 6 discussed herein.

Additionally, the control device 710 can include a communication interface 716 to facilitate communications between the control device 710 and various components of a wind farm or power system. Further, the communication interface 718 can include a sensor interface 718 (e.g., one or more analog-to-digital converters) to permit signals transmitted from one or more sensors 720, 722 to be converted into signals that can be understood and processed by the processor(s) 712. It should be appreciated that the sensors (e.g. sensors 720, 722) can be communicatively coupled to the communications interface 338 using any suitable means, such as a wired or wireless connection. The signals can be communicated using any suitable communications protocol.

As such, the processor(s) 712 can be configured to receive one or more signals from the sensors 720 and 722. For instance, in some embodiments, the processor(s) 712 can receive signals indicative of a wind speed or wind direction from the sensor 720, such as from one or more anemometers. In some embodiments, the processor(s) 712 can receive signals indicative of power delivery (e.g. amount of power generated) from sensor 722.

As used herein, the term "processor" refers not only to integrated circuits referred to in the art as being included in a computer, but also refers to a control device, a microcontrol device, a microcomputer, a programmable logic control device (PLC), an application specific integrated circuit, and other programmable circuits. Additionally, the memory device(s) 714 can generally include memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD) and/or other suitable memory elements. Such memory device(s) 714 can generally be configured to store suitable computer-readable instructions that, when implemented by the processor(s) 712, configure the control device 710 to perform the various functions as described herein.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A wind turbine cluster system, comprising:
   at least one doubly fed induction generator (DFIG) module, each DFIG module comprising:
   a DFIG comprising a rotor and a stator, the rotor configured to generate AC power at a first voltage and the stator configured to generate AC power at a second voltage; and
   a power conversion system operably coupled to the rotor, the power conversion system configured to convert the AC power at the first voltage to the AC power at the second voltage, the power conversion system comprising:
   a first bus electrically connected to the rotor,
   an AC to DC power converter electrically connected to the first bus, the AC to DC power converter configured to receive the AC power at the first voltage from the first bus,
   a DC link electrically connected to the AC to DC power converter and configured to receive DC power from the AC to DC power converter
   a DC to AC power converter electrically connected to the DC link, the DC to AC power converter configured to receive DC power from the DC link and converted to an AC power from the DC to AC power converter, and
   a transformer electrically connected to the DC to AC power converter, the transformer configured to transform the AC power from the DC to AC power converter to the AC power at the second voltage;
   a cluster transformer configured to receive the AC power at the second voltage from the at least one DFIG module and convert the AC power at the second voltage to power at a third voltage; and
   a control device configured to control operation of the cluster transformer based at least in part on a wind parameter.

2. The wind turbine cluster system of claim 1, wherein the cluster transformer comprises an on-line tap changing transformer, and
   wherein the control device is configured to change the position of the tap of the on-line tap changing transformer based at least in part on the wind parameter.

3. The wind turbine cluster system of claim 1, wherein the cluster transformer comprises a transformer with a first tap for low-wind operation and a second tap for normal operation, and
   wherein the control device is configured to change the position of the tap between the first tap and the second tap based at least in part on the wind parameter.

4. The wind turbine cluster system of claim 1, wherein the cluster transformer comprises a transformer with a first winding for low-wind operation and a second winding for normal operation, and
   wherein the control device is configured to switch between providing power to the first winding and the second winding based at least in part on the wind parameter.

5. The wind turbine cluster system of claim 1, wherein the power conversion system comprises:
   a resonant DC to DC to AC power converter configured to receive the DC power from the DC link and convert the DC power from the DC link to the AC power at the second voltage.

6. The wind turbine cluster system of claim 1, wherein the wind parameter comprises a concurrent wind parameter.

7. The wind turbine cluster system of claim 1, wherein the wind parameter comprises a forecasted wind parameter for a future time period.

8. The wind turbine cluster system of claim 1, wherein when the wind parameter comprises a wind parameter below a threshold, the control device is configured to control the cluster transformer to operate in a low-wind mode.

9. A method for operating a cluster transformer, the cluster transformer operably coupled to one or more doubly fed induction generator (DFIG) modules, each DFIG module comprising a DFIG and a power conversion system, the DFIG comprising a rotor and a stator, the rotor configured to generate AC power at a first voltage and the stator configured to generate AC power at a second voltage;
   the cluster transformer configured to convert power from the one or more DFIG modules into a power suitable for application to an electrical grid, the power conversion system comprising a first bus electrically connected to the rotor, an AC to DC power converter electrically connected to the first bus, the
   AC to DC power converter configured to receive the AC power at the first voltage from the first bus, a DC link electrically connected to the AC to DC power converter and configured to receive DC power from the AC to DC power converter, a DC to AC power converter electrically connected to the DC link, the DC to AC power converter configured to receive DC power from the DC link and converted to an AC power from the DC to AC power converter, and a transformer electrically connected to the DC to AC power converter, the transformer configured to transform the AC power from the DC to AC power converter to the AC power at the second voltage, the cluster transformer configured to receive the AC power at the second voltage from the at least one DFIG module and convert the AC power at the second voltage to power at a third voltage;
   the method comprising: operating the cluster transformer in a normal wind mode; determining, by a control device, a first wind parameter;
   determining, by the control device, whether the first wind parameter is less than a threshold; and
   when the first wind parameter is less than the threshold, controlling, by the control device, the cluster transformer into a low-wind operation mode.

10. The method of claim 9, wherein the cluster transformer comprises an on-line tap changing transformer, and
    wherein controlling, by the control device, the cluster transformer into a low-wind operation mode comprises controlling the position of the tap of the on-line tap changing transformer to a low-wind operation mode.

11. The method of claim 9, wherein the cluster transformer comprises a transformer with a first tap for low-wind operation and a second tap for normal operation, and
    wherein controlling, by the control device, the cluster transformer into a low-wind operation mode comprises controlling the position of the tap from the second tap to the first tap.

12. The method of claim 9, wherein the cluster transformer comprises a transformer with a first winding for low-wind operation and a second winding for normal operation, and wherein controlling, by the control device, the cluster transformer into a low-wind operation mode comprises switching between providing power to the second winding to providing power to the first winding.

13. The method of claim 9, wherein the first wind parameter comprises an estimated average wind speed based on one or more wind speed measurements.

14. The method of claim 9, wherein the first wind parameter comprises a forecasted wind parameter for a future time period.

15. The method of claim 14, wherein the forecasted wind parameter for the future time period is based at least in part on a wind model, a forecasted wind speed, or operational data.

16. The method of claim 9, further comprising:
determining a second wind parameter;
determining whether second wind parameter is greater than or equal to the threshold; and
when the second parameter is greater than or equal to the threshold, controlling, by the controlling, by the control device, the cluster transformer into a normal wind operation mode.

17. The method of claim 9, wherein the threshold comprises a wind speed of approximately 5 meters per second.

18. A wind farm, comprising:
a plurality of wind turbine clusters; and
a wind farm control device;
wherein each wind turbine cluster comprises:
a plurality of doubly fed induction generator (DFIG) modules; and
a cluster transformer operably coupled to the plurality of DFIG modules; wherein each DFIG module comprises:
a DFIG comprising a rotor and a stator, the rotor configured to generate AC power at a first voltage and the stator configured to generate AC power at a second voltage; and
a power conversion system operably coupled to the rotor, the power conversion system configured to convert the AC power at the first voltage to the AC power at the second voltage, the power conversion system comprising:
a first bus electrically connected to the rotor,
an AC to DC power converter electrically connected to the first bus, the AC to DC power converter configured to receive the AC power at the first voltage from the first bus,
a DC link electrically connected to the AC to DC power converter and configured to receive DC power from the AC to DC power converter,
a DC to AC power converter electrically connected to the DC link, the DC to AC power converter configured to receive DC power from the DC link and converted to an AC power from the DC to AC power converter, and
a transformer electrically connected to the DC to AC power converter, the transformer configured to transform the AC power from the DC to AC power converter to the AC power at the second voltage;
wherein each cluster transformer is configured to convert the AC power at the second voltage from the plurality of DFIG modules in each wind turbine cluster to power suitable for application to a grid; and wherein the wind farm control device is configured to control operation of the cluster transformer in each wind turbine cluster based at least in part on a measured or forecasted wind parameter.

19. The wind farm of claim 18, wherein the cluster transformer of each DFIG module comprises an on-line tap changing transformer, a transformer with a first tap for low-wind operation and a second tap for normal operation, or a transformer with a first winding for low-wind operation and a second winding for normal operation.

* * * * *